US006809900B2

(12) United States Patent
Covington (10) Patent No.: US 6,809,900 B2
(45) Date of Patent: Oct. 26, 2004

(54) WRITE HEAD WITH MAGNETIZATION CONTROLLED BY SPIN-POLARIZED ELECTRON CURRENT

(75) Inventor: Mark William Covington, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 459 days.

(21) Appl. No.: 09/943,329

(22) Filed: Aug. 30, 2001

(65) Prior Publication Data

US 2002/0135935 A1 Sep. 26, 2002

Related U.S. Application Data

(60) Provisional application No. 60/264,190, filed on Jan. 25, 2001.

(51) Int. Cl.[7] .................................................. G11B 5/33
(52) U.S. Cl. ....................................................... 360/126
(58) Field of Search ................................ 360/126, 125, 360/319, 324.2, 321

(56) References Cited

U.S. PATENT DOCUMENTS

| | | | | |
|---|---|---|---|---|
| 3,921,217 A | * | 11/1975 | Thompson | 360/321 |
| 5,576,914 A | | 11/1996 | Rottmayer et al. | 360/324 |
| 5,668,688 A | | 9/1997 | Dykes et al. | 360/324.1 |
| 5,695,864 A | | 12/1997 | Slonczewski | 428/212 |
| 5,891,586 A | | 4/1999 | Hasegawa et al. | 428/668 |
| 5,930,087 A | * | 7/1999 | Brug et al. | 360/324.2 |
| 6,105,237 A | | 8/2000 | Gill | 29/603.08 |
| 6,130,814 A | | 10/2000 | Sun | 361/143 |
| 6,219,212 B1 | | 4/2001 | Gill et al. | 360/324.2 |
| 6,396,670 B1 | * | 5/2002 | Murdock | 360/319 |

OTHER PUBLICATIONS

W. Cain et al. "Challenges in the Practical Implementation of Perpendicular Magnetic Recording," *IEEE Transactions on Magnetics*, vol. 32, No. 1, Jan. 1996, pp. 97–102.
J. C. Slonczewski, "Current–Driven Excitation of Magnetic Multilayers," *Journal of Magnetism and Magnetic Materials*, vol. 159, 1996, pp. L1–L7.
M. Tsoi et al, "Excitation of a Magnetic Multilayer by an Electric Current," *The American Physical Society*, vol. 80, No. 19, May 11, 1998, pp. 4281–4284.
E. B. Myers et al, "Current–Induced Switching of Domains in Magnetic Multilayer Devices," *Science*, vol. 285, Aug. 6, 1999, pp. 867–870.

(List continued on next page.)

*Primary Examiner*—Tianjie Chen
(74) *Attorney, Agent, or Firm*—Robert P. Lenart, Esq.; Pietragallo, Bosick & Gordon (57) ABSTRACT

A write head for a disk drive includes a first layer of magnetic material having a fixed magnetization aligned in a first direction, a second layer of magnetic material having a changeable magnetization aligned in a quiescent state in a second direction orthogonal to the first direction, a first non-magnetic layer positioned between the first layer of magnetic material and the second layer of magnetic material, electrodes for connection to a current supply for passing an electric current through the first layer of magnetic material, the first non-magnetic layer, and the second layer of magnetic material for switching the changeable magnetization of the second layer, and an arm for positioning a first edge of the second layer of magnetic material adjacent to a magnetic recording medium, whereby the magnetization of the second layer of magnetic material affects magnetization of the magnetic recording medium. A method of recording information bits in a magnetic recording medium using the write head is also included.

24 Claims, 8 Drawing Sheets

OTHER PUBLICATIONS

K. Bussmann et al, "Switching of Vertical Giant Magnetoresistance Devices by Current Through the Device," *American Institute of Physics*, vol. 75, No. 16, Oct. 18, 1999, pp. 2476–2478.

J. Z. Sun, "Current–Driven Magnetic Switching in Manganite Trilayer Junctions," *Journal of Magnetism and Magnetic Materials*, vol. 202, 1999, pp. 157–162.

R. Wood, "The Feasibility of Magnetic Recording at 1 Terabit Per Square Inch," *IEEE Transactions on Magnetics*, vol. 36, No. 1, Jan. 2000, pp. 36–42.

H. Katayama et al, "New Developments in Laser–Assisted Magnetic Recording," *IEEE Transactions on Magnetics*, vol. 36, No. 1, Jan. 2000, pp. 195–199.

J. A. Katine et al, "Current–Induced Realignment of Magnetic Domains in Nanostructured Cu/Co Multilayer Pillars," *American Institute of Physics*, vol. 76, No. 3, Jan. 17, 2000, pp. 354–356.

J. A Katine et al, "Current–Driven Magnetization Reversal and Spin–Wave Excitations In Co/Cu/Co Pillars," *The American Physical Society*, vol. 84, No. 14, Apr. 3, 2000, pp. 3149–3152.

F. J. Albert et al, "Spin–Polarized Current Switching of a Co Thin Film Nanomagnet," *American Institute of Physics*, vol. 77, No. 23, Dec. 4, 2000, pp. 3809–3811.

* cited by examiner

WRITE HEAD WITH MAGNETIZATION CONTROLLED BY SPIN-POLARIZED ELECTRON CURRENT

CROSS REFERENCE TO RELATED APPLICATION

This application claims the benefit of U.S. Provisional Patent Application No. 60/264,190, filed Jan. 25, 2001.

BACKGROUND OF THE INVENTION

This invention relates to magnetic devices, and more particularly, to write heads for use in disk drives.

Thin film recording heads include a writer and a reader that respectively record and detect magnetic domains in a disk that spins below the head. The writer in a conventional recording head includes a soft ferromagnetic yoke that is wrapped around a coil of one or more turns. Writers operate by passing an electrical current through the coil, which produces a magnetic field that aligns the yoke magnetization along the field direction. The magnetization rotates such that, for a longitudinal writer, a magnetic field extends mainly between the pole tips but also partly into the media. For a perpendicular writer, a soft underlayer is typically employed such that the write field extends between the pole tip and soft underlayer. When the write field exceeds the coercivity and demagnetization field of the media, a domain forms with its magnetization aligned along the write field direction. These domains form the bits of digital data that are detected with the read head.

There has been steady improvement in the performance of thin film recording heads as the areal density of data in magnetic storage media has increased. However, there has been a striking difference between the evolution of the reader and that of the writer. The read head has undergone major technological changes as the industry has moved from inductive to magnetoresistive and giant magnetoresistive heads. In contrast, the write head has merely evolved using the same basic coil and yoke technology. The yoke length has decreased, the number of coils has been reduced, the pole tips have become narrower. But, the fundamental design and operation of the writer is the same. The writer includes a yoke in which the magnetization is driven by the field from a current-carrying wire.

The traditional writer design continues to meet the goals of high-density recording, but the physical limits of conventional technology are being seriously tested. For areal data densities of 100 Gbit/in$^2$, the National Storage Industry Consortium design specifies a bit size of roughly 40 nm along the track direction and 150 nm in the cross track direction. One of the preliminary proposals for 1 Tbit/in$^2$ data density has targeted bit sizes of 14 nm long by 47 nm wide. These areal densities require the pole tip on the write head to have an extremely narrow track-width. The 1 Tbit/in$^2$ specification for the write width is 38 mn. Furthermore, the requirement of thermal stability will necessarily mean that high-anisotropy media will be used, which in turn will need much larger write fields in order to record bits. Hence, these design parameters impose many challenges. The narrowing of the track width will necessarily reduce the cross-sectional area of the writer pole tip. This will increase the yoke reluctance and, consequently, decrease the writer efficiency. A drop in efficiency will require a larger write current. However, the write current cannot be made arbitrarily large without producing undesirable levels of Joule heating. Furthermore, it is difficult and expensive to produce large-amplitude current pulses with fast rise times. In addition, the use of high-moment materials in the writer requires larger write currents to switch the magnetization, in comparison to heads made with softer, lower moment alloys. This is because high-moment ferromagnetic materials tend to be harder magnetically than lower moment alloys, such as NiFe.

Magnetic excitation by spin transfer has been proposed for use in data storage devices. U.S. Pat. No. 5,695,864 discloses a means of dynamically remagnetizing or magnetically exciting a very thin ferromagnetic film, without the use of an externally applied magnetic field. Electrons flow through a free or excitable magnet, or reflect from it, to make its magnetization respond. To accomplish this, the spin vectors of the flowing electrons must be preferentially polarized by an auxiliary ferromagnet, whose moment orientation is fixed. The electrons flow between the fixed and free ferromagnets through a non-magnetic metallic spacer which is thick enough to make the static inter-magnetic exchange coupling negligible. While transmitting through or reflecting from the free ferromagnet, the spins of the moving electrons interact by quantum-mechanical exchange with the local, permanently present, spontaneously-polarized electron spins of the free magnet. This interaction causes a transfer of vectorial angular momentum between the several metallic layers in the device which causes the magnetization vector of the free magnet to change its direction continually with time. Thus excited, the magnetization vector will precess about its original axis. The precession cone angle will either attain a new equilibrium value which will be sustained by the current or will increase beyond 90° and precess with decreasing amplitude until the magnetization vector has reversed by 180° from its initial direction (i.e., switched). Information is stored in a disk by passing current between a write stylus and the disk.

There is a need for a magnetic write head that can overcome the limitations of existing write heads to achieve increased areal data densities in magnetic recording media.

SUMMARY OF THE INVENTION

A write head for a disk drive constructed in accordance with this invention includes a first layer of magnetic material having a fixed magnetization aligned in a first direction, a second layer of magnetic material having a changeable magnetization aligned in a quiescent state in a second direction orthogonal to the first direction, a first non-magnetic layer position between the first layer of magnetic material and the second layer of magnetic material, means for connection to a current supply for passing an electric current through the first layer of magnetic material, the first non-magnetic layer, and the second layer of magnetic material for switching the changeable magnetization of the second layer, and means for positioning a first edge of the second layer of magnetic material adjacent to a magnetic recording medium, whereby the magnetization of the second layer of magnetic material affects magnetization of the magnetic recording medium.

The invention also encompasses a method of writing to a magnetic storage media using the write head. The method includes the steps of providing a write head including a first layer of magnetic material having a fixed magnetization aligned in a first direction, a second layer of magnetic material having a changeable magnetization aligned in a quiescent state in a second direction orthogonal to the first direction, a non-magnetic layer positioned between the first layer of magnetic material and the second layer of magnetic material, positioning the write head adjacent to a magnetic storage media such that the second layer of magnetic material lies in a plane perpendicular to a surface of the magnetic storage media, and passing an electric current through the write head, thereby changing the direction of magnetization of the second layer of magnetic material and producing fringing magnetic flux for recording information bits in the magnetic storage media.

More generally the invention provides a method of recording information in a magnetic storage medium comprising the steps of positioning a layer of magnetic material in a plane perpendicular to a surface of the magnetic storage medium, and changing the magnetization of the layer of magnetic material through spin transfer to produce fringing magnetic flux for recording information bits in the magnetic storage media.

DESCRIPTION OF THE PREFERRED EMBODIMENT

This invention utilizes spin transfer to control magnetization of a free layer in a write head. The magnetization of the free layer creates a magnetic field that can be used to record information bits in an adjacent magnetic recording medium.

Figure 1:
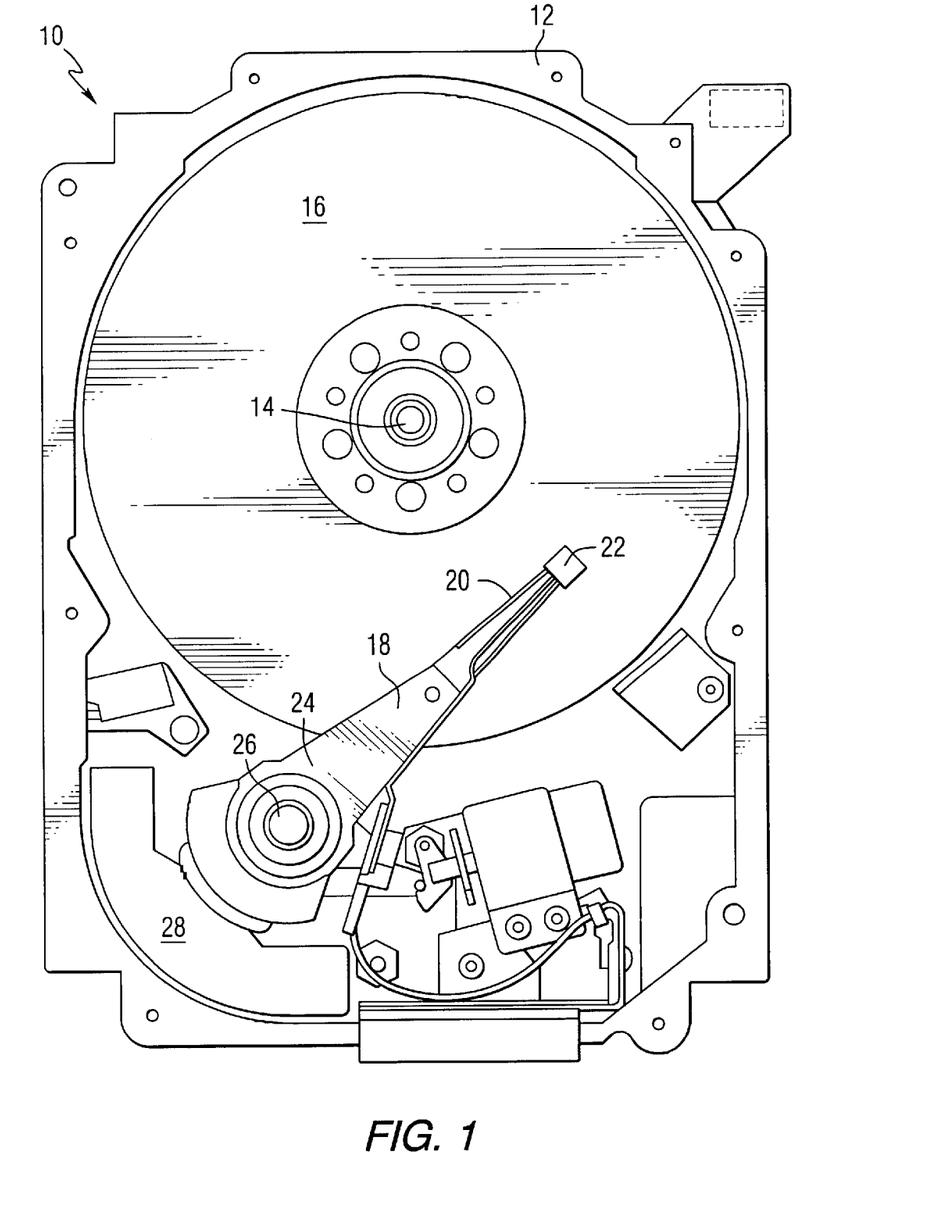
FIG. 1 is a pictorial representation of a disk drive that can use magnetic write heads constructed in accordance with this invention.

One embodiment of the invention provides magnetic write heads for use with magnetic recording media, and methods for using the write heads to record data bits in magnetic recording media. Write heads constructed in accordance with the invention are particularly suitable for use within a disk drive for computers. FIG. 1 is a pictorial representation of a typical disk drive 10 that can utilize magnetic sensors constructed in accordance with this invention. The disk drive includes a housing 12 (with the upper portion removed and the lower portion visible in this view) sized and configured to contain the various components of the disk drive. The disk drive includes a spindle motor 14 for rotating at least one magnetic storage medium 16 within the housing, in this case a magnetic disk. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disk 16. The actuator motor 28 is regulated by a controller that is not shown in this view and is well known in the art.

Figure 2:
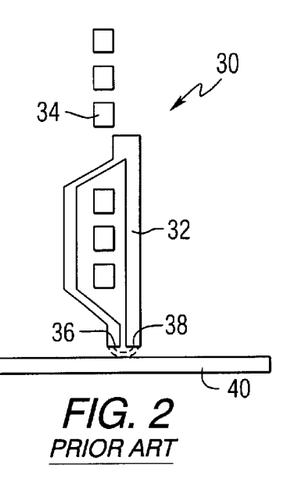
FIG. 2 is a schematic representation of a prior art disk drive write head.
Figure 3:
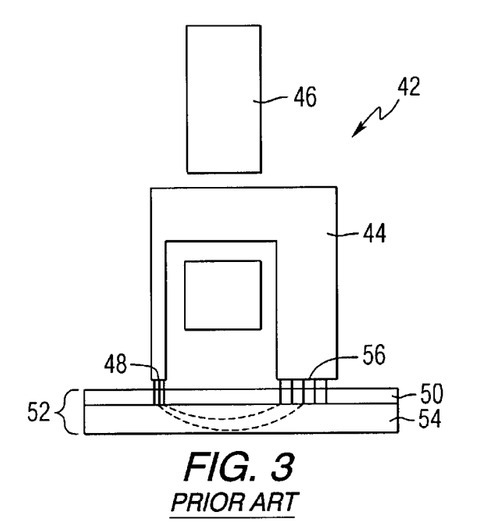
FIG. 3 is a schematic representation of another prior art disk drive write head.

FIGS. 2 and 3 are schematic representations of portions of write heads constructed in accordance with the prior art. The write head 30 of FIG. 2 includes a ferromagnetic yoke 32 of soft ferromagnetic material is wrapped around a coil 34 that carries an electric current. The magnetic field from the current affects the yoke magnetization such that the fringing magnetic field penetrates the media and records bits. The fringing magnetic write field is produced at the ends 36, 38 of the yoke. The write field is used to record information bits in a magnetically hard layer of a magnetic storage medium 40. The write head 42 of FIG. 3 includes a ferromagnetic yoke 44 and a coil 46 for producing a magnetic field in the yoke. As a result of current flowing in the coil, a write field is produced at an end 48 of the yoke. The write field is used to record information bits in a magnetically hard layer 50 of a magnetic storage medium 52. The magnetic medium also includes a magnetically soft layer 54 that conducts the magnetic field to a second end 56 of the yoke.

Figure 4:
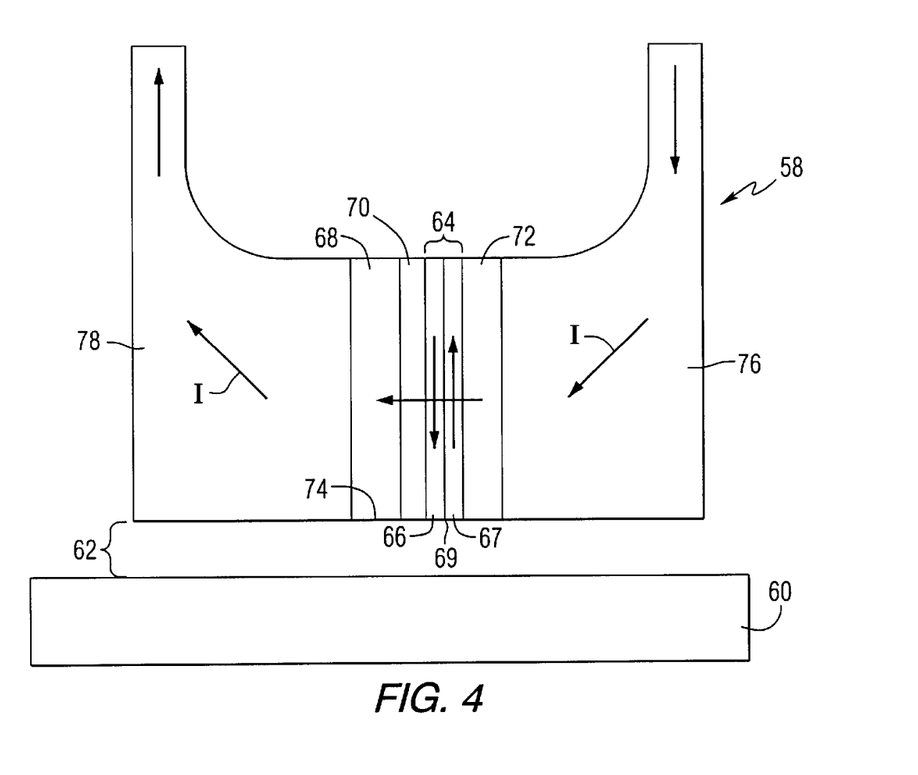
FIG. 4 is a side elevation view of a magnetic write head constructed in accordance with the invention.

FIG. 4 is a side elevation view of a magnetic write head 58 constructed in accordance with the invention. The write head 58 is positioned adjacent to a magnetic recording medium 60, and separated from the magnetic recording medium by an air bearing 62. Arm 18 as shown in FIG. 1 can serve as a means for positioning the write head adjacent to a magnetic recording medium. The write head includes a first layer of magnetic material 64, also called the pinned layer, having a fixed magnetization aligned in a first direction. The direction of magnetization is perpendicular to the surface of the magnetic media, and oriented either toward or away from the magnetic media. The first layer in this embodiment is a synthetic antiferromagnet (SAF). The synthetic antiferromagnet includes two ferromagnetic layers 66, 67, separated by a non-magnetic transition metal spacer 69 that induces very strong antiferromagnetic coupling, such as Ru. The magnetization of each ferromagnetic layer of the antiferromagnet is fixed along one specific direction as shown by the arrows in layers 66 and 67. The pinned layer in FIG. 4 is a pinned SAF, in which one layer in the SAF is exchange coupled to an antiferromagnet. Other examples of pinned layers that could be used include: a single ferromagnetic layer exchange coupled to an antiferromagnet; a single layer of hard magnetic material, such as CoPt; or a single ferromagnetic layer exchange coupled to a hard magnet.

A second layer of magnetic material 68, also called the free layer, having a changeable magnetization aligned in a quiescent state in a second direction orthogonal to the first direction, is separated from the first layer of magnetic material by a first non-magnetic layer 70 positioned between the first layer of magnetic material and the second layer of magnetic material. The non-magnetic layer can be constructed of, for example, copper, silver or gold. A means 72 for biasing the magnetization of the pinned layer, which can be for example a permanent magnet or an antiferromagnet, is positioned adjacent to the first layer of magnetic material. The write head is positioned such that a first edge 74 of the free layer lies adjacent to a surface of the magnetic recording medium. The magnetization of the free layer produces magnetic flux at the first edge of the free layer that is used to record information bits in the magnetic recording medium.

Means 76, 78 are provided for connection to a current supply for passing an electric current, I, through the first layer of magnetic material, the first non-magnetic layer, and the second layer of magnetic material in a direction perpendicular to the planes of the layers for switching the changeable magnetization of the second layer. Means 76 and 78 can comprise non-magnetic current leads that are electrically connected to conduct current through the pinned layer 64, the non-magnetic layer 70 and the free layer 68. This current is used to change the direction of magnetization of the free layer. A magnetic field resulting from the magnetization of the free layer is used to record information bits in the magnetic recording medium. Write heads constructed according to this invention include a pillar of alternating magnetic and non-magnetic materials that is connected to metallic leads that pass electrical current in a perpendicular direction through the stack. The active part of the device is a soft ferromagnetic free layer that has the direction of its magnetization controlled by the torque exerted by the spin-polarized current from a pinned layer (in this case a pinned synthetic antiferromagnet). The fringe fields from the free layer penetrate the media and record bits. FIG. 4 shows an air bearing between the write head and the magnetic recording medium. However, this invention also encompasses embodiments used for contact recording in which there is no air bearing. Thus in the above description, the words "adjacent to" encompass both "near" and "in contact with".

Figure 5A:
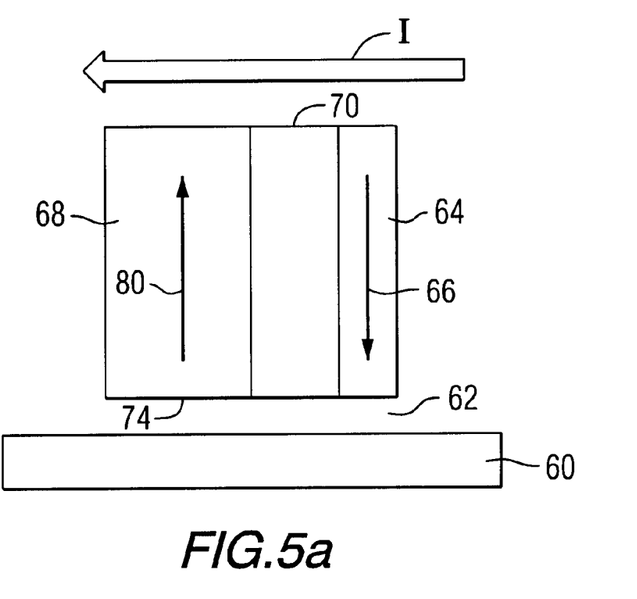
FIGS. 5a and 5b are side elevation views of a portion of a magnetic write head constructed in accordance with the invention.
Figure 5B:
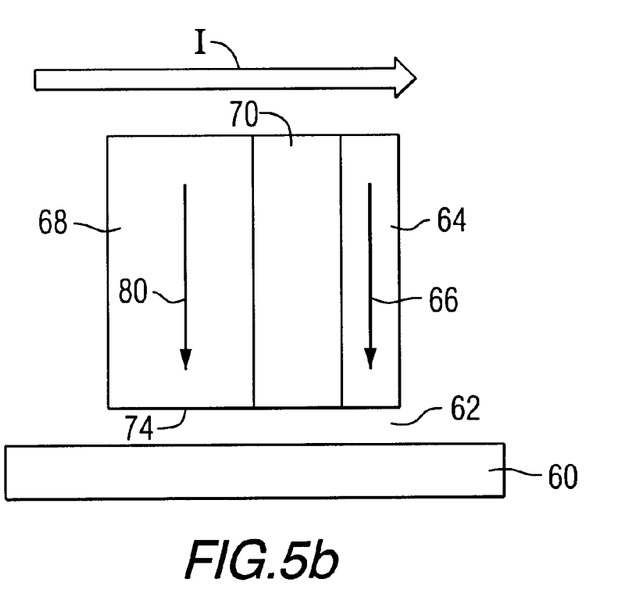

FIGS. 5*a* and 5*b* are side elevation views of a portion of a magnetic write head constructed in accordance with a first embodiment of the invention. These Figures show the resulting alignment of the free layer 68 magnetization with respect to the pinned layer 64 magnetization when the current surpasses a directionally dependent threshold. In FIG. 5*a*, electrical current from the pinned layer to the free layer (electron current from free layer to the pinned layer) induces antiparallel alignment of the magnetizations for currents above the threshold $I_c^+$. In FIG. 5*b*, current flow in the opposite direction to that in (a) induces parallel alignment below a different threshold current, $I_c^- < I_c^+$.

In FIGS. 5*a* and 5*b*, the magnetization of the pinned layer 64, as illustrated by arrow 66, is shown to be oriented in a direction toward the magnetic recording medium 60. When a current I that is greater than $I_c^+$ passes through the pinned layer 64, the non-magnetic layer 70 and the free layer 68, the magnetization of the free layer as illustrated by arrow 80, is switched to lie in a direction antiparallel to the direction of magnetization of the pinned layer. When a current I that is less than $I_c^-$ passes through the pinned layer 64, the non-magnetic layer 70 and the free layer 68, the magnetization of the free layer as illustrated by arrow 80, is switched to lie in a direction parallel to the direction of magnetization of the pinned layer.

Figure 6A:
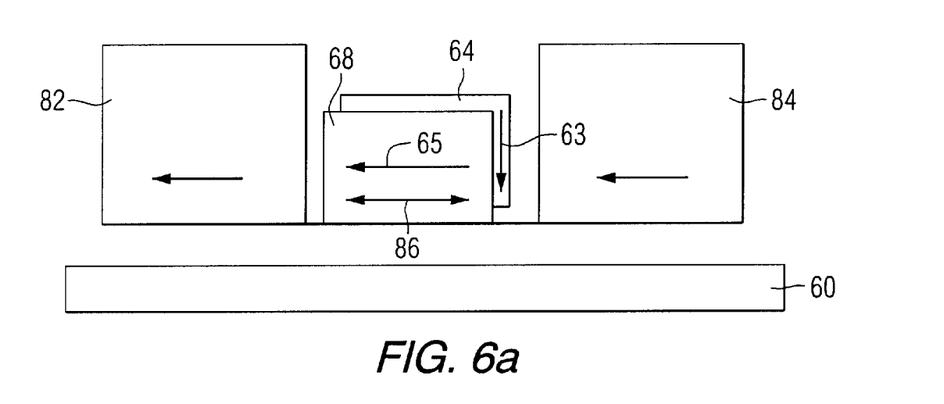
FIGS. 6a, 6b and 6c are schematic representations of a portion of a magnetic write head constructed in accordance with the invention.

FIGS. 6*a*, 6*b*, and 6*c* are schematic representations of a portion of a magnetic write head constructed in accordance with the invention. FIG. 6*a* shows a portion of the write head including permanent magnets 82 and 84 that are positioned on opposite sides of the free layer 70 to bias the quiescent magnetization in the easy axis direction, as illustrated by arrow 86, that is parallel to the surface of the magnetic recording medium and orthogonal to the direction of the magnetization of the pinned layer. The quiescent magnetization direction can also be controlled by passing a low magnitude electrical current through the write head, by using shape anisotropy, or by other techniques.

Figure 6B:
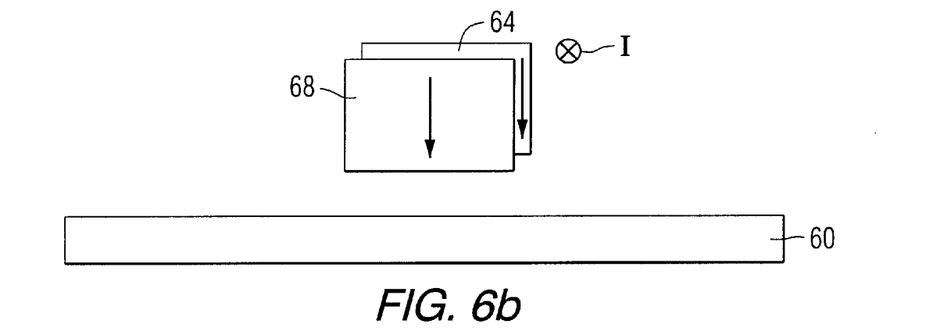
Figure 6C:
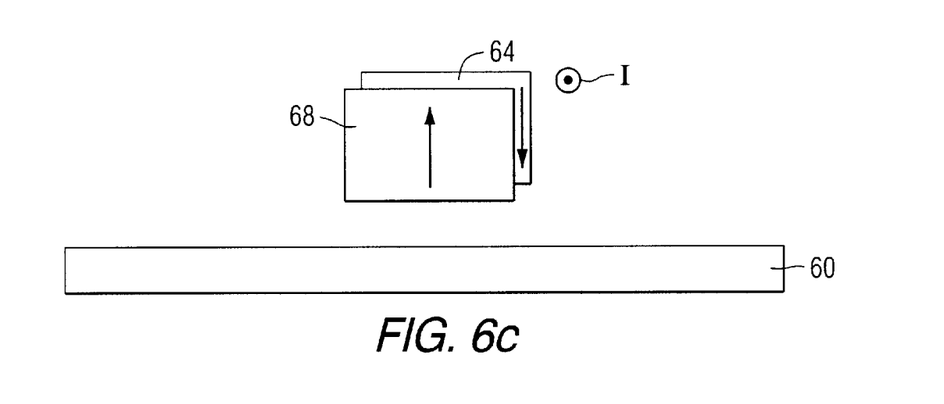

FIGS. 6*a*, 6*b*, and 6*c* illustrate the free layer magnetization with respect to the pinned layer. The pinned layer magnetization is fixed and oriented in a first direction 63 either toward or away from the air-bearing surface. FIG. 6*a* shows the quiescent state of the device with the free layer magnetization parallel to the air bearing surface (ABS). There is nominally no field component, aside from stray fields, directed toward the media by the free layer. This example indicates a couple of options, such as shape anisotropy, field-induced uniaxial anisotropy, and magnetostatic fields from permanent magnets, to bias the free layer in a second direction 65 offset 90° with respect to the pinned layer. Note that, in general, the quiescent state bias current, $I_q$ may need to be different than zero in order to keep the free layer parallel to the ABS. FIG. 6*b* shows biasing of the device below the threshold current of $I_c^-$. The free layer magnetization is oriented toward the media. FIG. 6*c* shows biasing of the device above the threshold current of $I_c^-$. The free layer magnetization is oriented away from the media.

Figure 7:
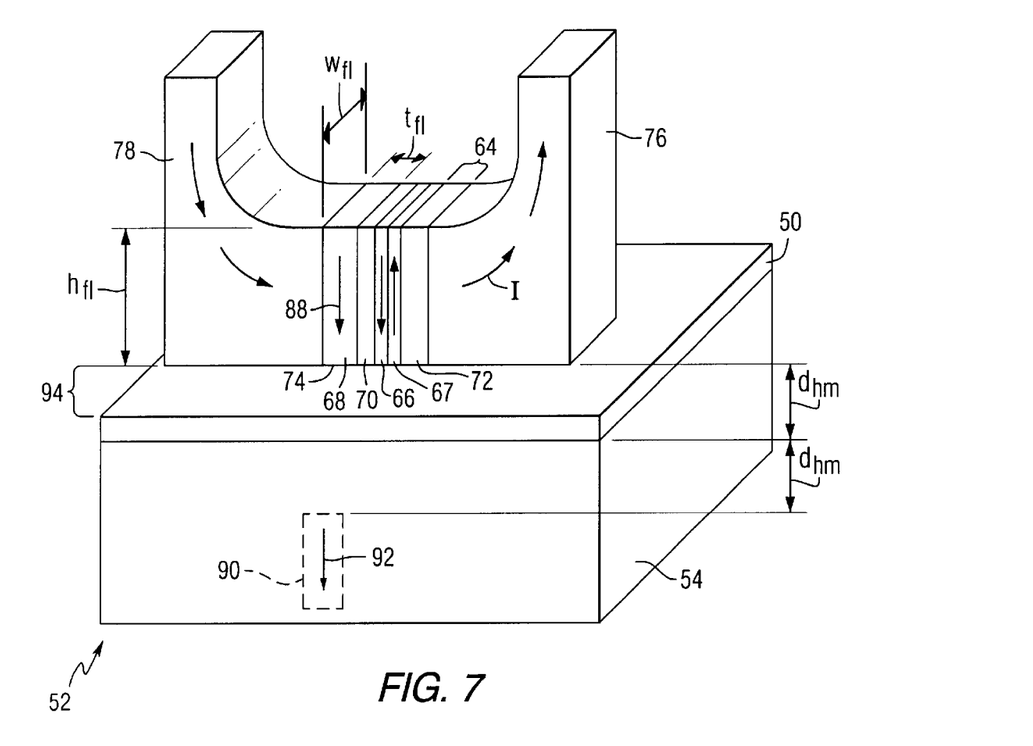
FIG. 7 is a pictorial representation of a magnetic write head constructed in accordance with the invention.

FIG. 7 is a pictorial representation of a magnetic write head constructed in accordance with the invention. In FIG. 7, the magnetic recording medium 52 is seen to include a magnetically hard layer 50 and a magnetically soft underlayer 54 positioned below the magnetically hard layer. When current passes through the write head to produce the magnetization orientation illustrated by arrow 88 in the free layer 68, an image 90 of the free layer is created in the soft underlayer. The magnetization of the image as shown by arrow 92, is oriented in the same direction as the magnetization of the free layer as illustrated by arrow 88. The first edge 74 of the free layer is positioned a distance $d_{hm}$ from the top surface of the soft underlayer and the image of the free layer is positioned the same distance $d_{hm}$ below the top surface of the soft underlayer. The thickness of the free layer is $t_{fl}$. The width of the free layer is $w_{fl}$. The height of the free layer is $h_{fl}$.

The recording head is separated from the hard layer by the combined thickness 94 of the air bearing, lube, and overcoat. The free layer is uniformly magnetized toward the media, which produces an image in the soft underlayer directly below the free layer. The separation between the free layer and its image is equal to twice the distance between the bottom of the free layer and the top of the soft underlayer $d_{hm}$, as shown. The thickness $t_{fl}$, width $w_{fl}$, and height $h_{fl}$ of the free layer are labeled accordingly. The free layer magnetization produces a magnetic field that is used to write data in the hard layer of the magnetic storage medium.

Figure 8:
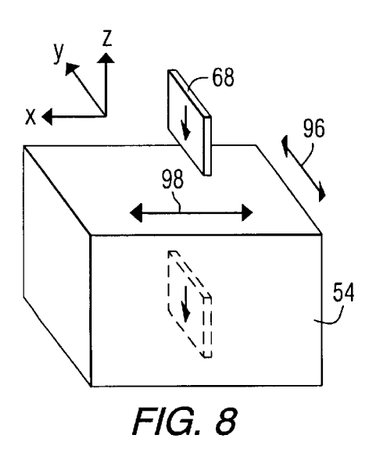
FIG. 8 illustrates a portion of a magnetic write head constructed in accordance with the invention having an magnetic layer positioned in a plane lying parallel to the cross-track direction of a magnet recording media.
Figure 9:
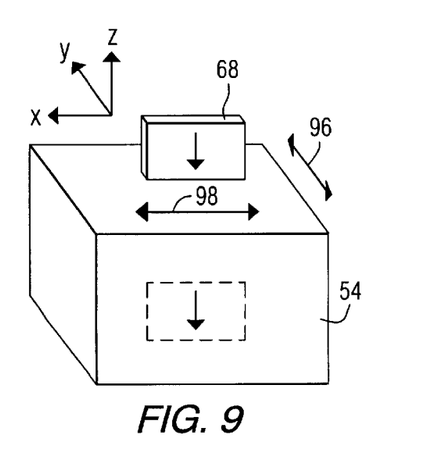
FIG. 9 illustrates a portion of a magnetic write head constructed in accordance with the invention having a magnetic layer positioned in a plane lying perpendicular to the cross-track direction of a magnet recording media.

FIG. 8 illustrates the orientation of the free layer of the magnetic write head in a y-z plane lying parallel to the cross-track direction (y), as shown by arrow 96, of a magnetic recording media. The down-track direction is in the x direction, as shown by arrow 98. FIG. 9 illustrates the orientation of the free layer of the magnetic write head in an x-z plane lying parallel to the down-track direction (x) of a magnet recording media. The cross-track direction is in the y direction.

The orientation of the head with respect to the tracks will impact the design. For instance, the track width would be set by the width of the free layer $w_{fl}$, as defined in FIG. 7, for a slider fabricated in much the same manner as present spin-valve read heads. For the following description, this orientation will be referred to as Design I. This orientation of the free layer with respect to the tracks is shown in FIG. 8. However, it is also possible to build the head on the side of a slider or deposit the multilayers on a lithographically defined vertical sidewall of a conventional slider, in which case the track width would be set by the free layer thickness $t_{fl}$, which is also defined in FIG. 7. This orientation will be referred to as Design II. This orientation of the free layer with respect to the tracks as illustrated in FIG. 9. The free layer parameters for Design I and Design II are listed in the following table.

| Parameter | Design I | | Design II | |
| --- | --- | --- | --- | --- |
| $w_{fl}$ | 38 nm | cross-track direction (x) | 50 nm | down-track direction (y) |
| $t_{fl}$ | 15 nm | down-track direction (y) | 12 nm | cross-track direction (x) |
| $h_{fl}$ | 25 nm | perp. to media (z) | 25 nm | perp. to media (z) |
| $A = w_{fl} \times h_{fl}$ | 950 nm$^2$ | | 1250 nm$^2$ | |
| $V = w_{fl} \times h_{fl} \times t_{fl}$ | 14600 nm$^3$ | | 14600 nm$^3$ | |
| $I_c$ | 5 mA | | 5 mA | |
| $J_c$ | ~5 × 10$^8$ A/cm$^2$ | | ~4 × 10$^8$ A/cm$^2$ | |

Figure 10A:
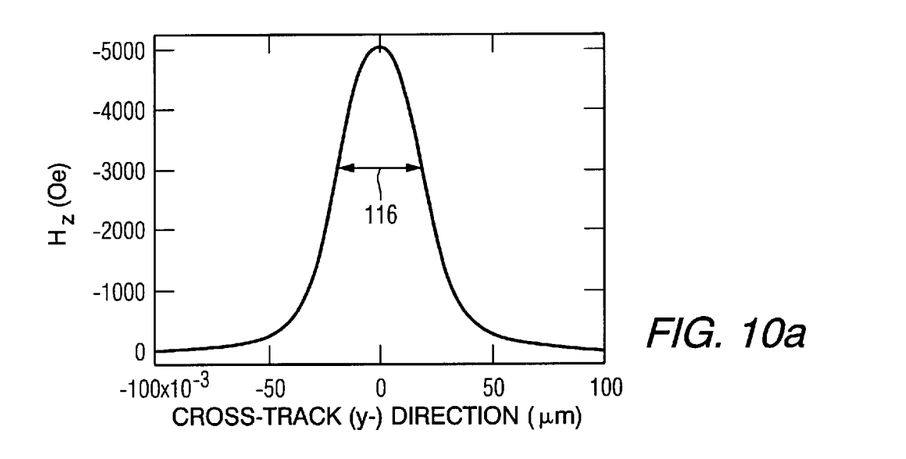
FIGS. 10a, 10b and 10c are graphs illustrating the calculated magnetic fields associated with the arrangement illustrated in FIG. 8.
Figure 10B:
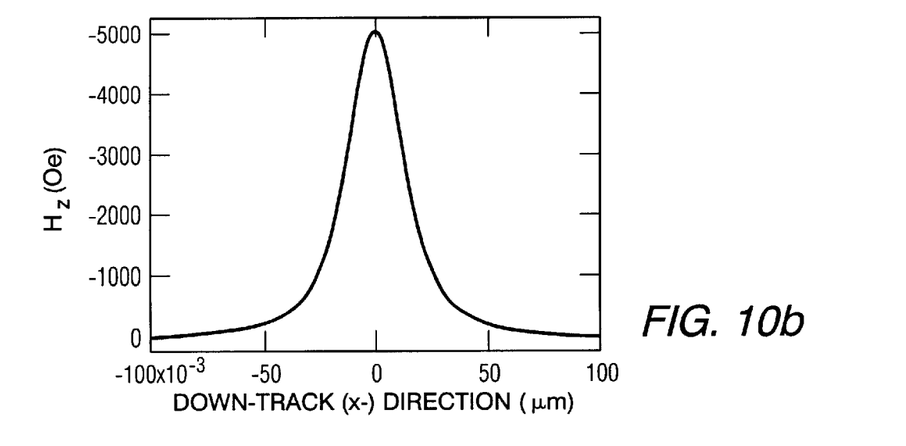
Figure 10C:
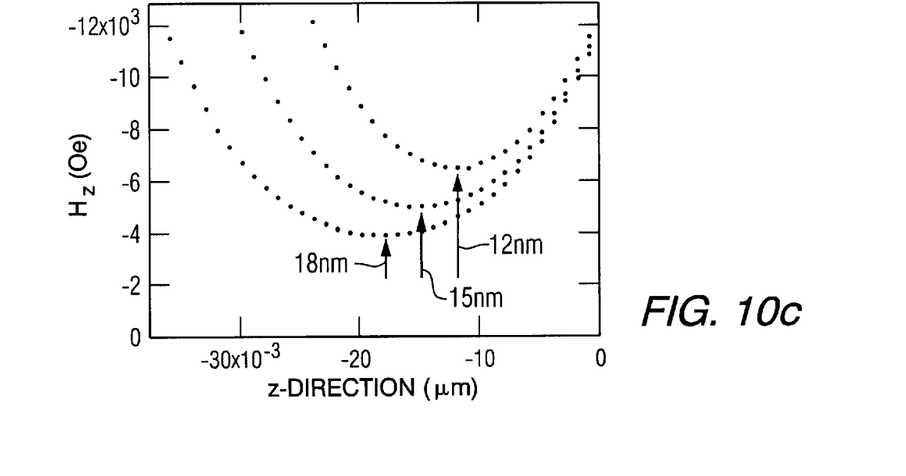

FIGS. 10a, 10b and 10c show the write field calculations for Design I. FIG. 8 shows a schematic representation of the geometry and coordinate system used for the write field calculation. FIGS. 10a and 10b are graphs illustrating the calculated magnetic fields in the cross-track and down-track directions for the free layer when it is oriented as illustrated in FIG. 8. FIG. 10c is a graph illustrating the calculated magnetic field in the z-direction for various distances between the edge of the free layer and the top of the soft magnetic layer of the magnetic recording medium.

Figure 11A:
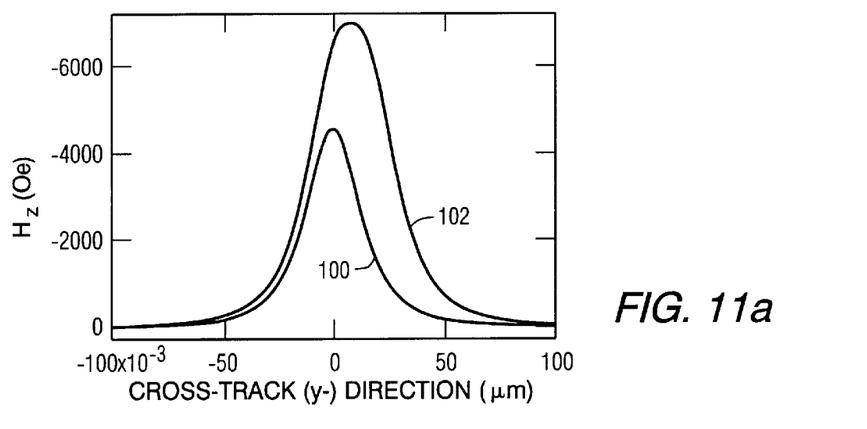
FIGS. 11a, 11b and 11c are graphs illustrating the calculated magnetic fields associated with the arrangement illustrated in FIG. 9.
Figure 11B:
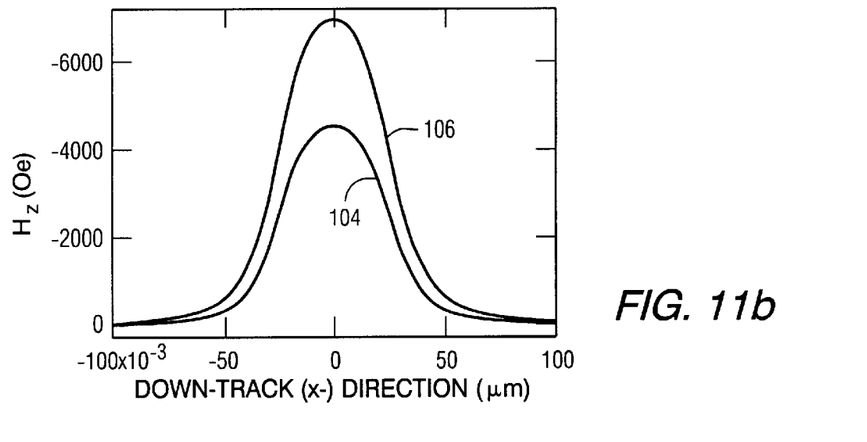
Figure 11C:
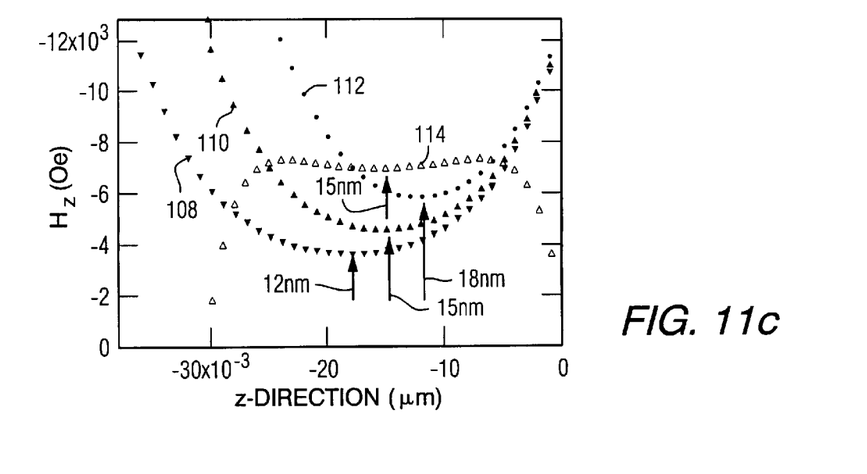

FIGS. 11a and 11b are graphs illustrating the calculated magnetic fields in the cross-track and down-track directions for the free layer when it is oriented as illustrated in FIG. 9. In FIG. 11a, curve 100 represents data for a write head having one free layer, and curve 102 represents data for a write head having two free layers. In FIG. 11b, curve 104 represents data for a write head having one free layer, and curve 106 represents data for a write head having two free layers. FIG. 11c is a graph illustrating the calculated magnetic field in the z-direction for various distances between the edge of the free layer and the top of the soft magnetic layer of the magnetic recording medium. In FIG. 11c, curves 108, 110 and 112 represent data for a write head having one free layer at various distances $d_{hm}$, and curve 114 represents data for a write head having two free layers.

The free layer is uniformly magnetized in the negative z-direction and forms an image in the soft underlayer. The origin of the x-direction and the y-direction is at the center of the free layer. The origin of the z-direction is at the center of the bottom edge of the free layer (at the edge closest to the recording media). Note that the calculations assume a soft ferromagnetic yoke behind the free layer that perfectly screens the magnetic charge on the edge of the free layer opposite the ABS. FIG. 10a shows the field component along the z-direction (the write field for perpendicular media) versus the cross-track direction (y-direction). Note that x=0. The arrow 116 indicates the 38 nm track width as discussed above. FIG. 10b shows the z-component of the field versus the down-track direction (x-direction). Note that y=0. FIG. 10c shows the z-component of the magnetic field versus the position between the free layer and its image in the soft underlayer. The bottom of the free layer is defined as z=0 and both x and y equal 0. The three sets of data in FIG. 10c correspond to different head-to-soft underlayer separations and are labeled on the figure accordingly. The arrows indicate the position of the top of the soft underlayer for each respective head-media separation.

FIGS. 11a, 11b and 11c show the write field calculations for Design II. FIG. 9 is a schematic representation of the geometry and coordinate system used for the write field calculation. The free layer is uniformly magnetized in the negative z-direction and forms an image in the soft underlayer. The origin of the coordinate system is at the center of the free layer. Note that the calculations assume a soft ferromagnetic yoke behind the free layer that perfectly screens the magnetic charge on the edge of the free layer opposite the ABS. FIGS. 11a, 11b and 11c are similar to FIGS. 10a, 10b and 10c with the exception that these calculations also include data for the design with two free layers side-by-side, uniformly magnetized in the same direction, and separated by a 5 nm gap.

Figures 12, 13, 14:
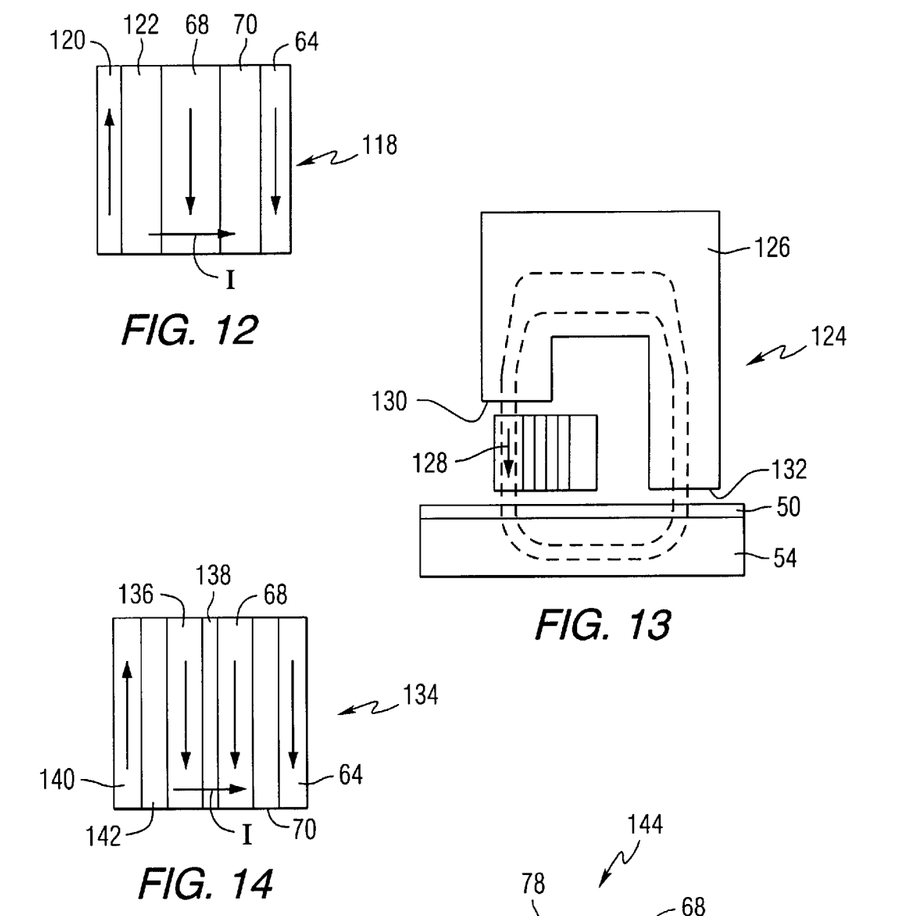
FIG. 12 is a side elevation view of a portion of a magnetic write head constructed in accordance with another embodiment of the invention.
FIG. 13 is a side elevation view of a portion of a magnetic write head constructed in accordance with another embodiment of the invention.
FIG. 14 is a side elevation view of a portion of a magnetic write head constructed in accordance with another embodiment of the invention.

A second pinned layer can be added to the multilayer pillar to increase the torque on the free layer by a factor of two. FIG. 12 is a side elevation view of a portion of a magnetic write head 118 constructed in accordance with another embodiment of the invention. The embodiment of FIG. 12 adds a second pinned layer 120 separated from the free layer 68 by a second non-magnetic layer 122. With this arrangement, the two pinned layers provide greater torque on the free layer 68.

A soft ferromagnetic yoke can be used to screen the magnetic charge that develops on the back of the free layer and enhance the write field. FIG. 13 is a side elevation view of a portion of a magnetic write head 124 constructed in accordance with another embodiment of the invention. In the embodiment of FIG. 13, a ferromagnetic yoke 126 is positioned adjacent to the previously described structure of the write head. The ferromagnetic yoke conducts magnetic flux 128 passing through the free layer of the write head and through the magnetic recording medium to assist in perpendicular recording of the information bits in the magnetically hard layer of the magnetic recording medium. The yoke includes a first end 130 positioned adjacent to the free layer and a second end 132 positioned adjacent to the surface of the magnetic recording medium at a location spaced from the free layer.

A device with two free layers magnetically decoupled by a spacer can be used to promote better quiescent state magnetics in the free layers. FIG. 14 is a side elevation view of a portion of a magnetic write head 134 constructed in accordance with another embodiment of the invention. The embodiment of FIG. 14 includes two free layers 68 and 136 separated by a non-magnetic spin-depolarizing spacer 138. A second pinned layer 140 is separated from the second free layer 136 by a layer 142 of non-magnetic material.

Figure 15:
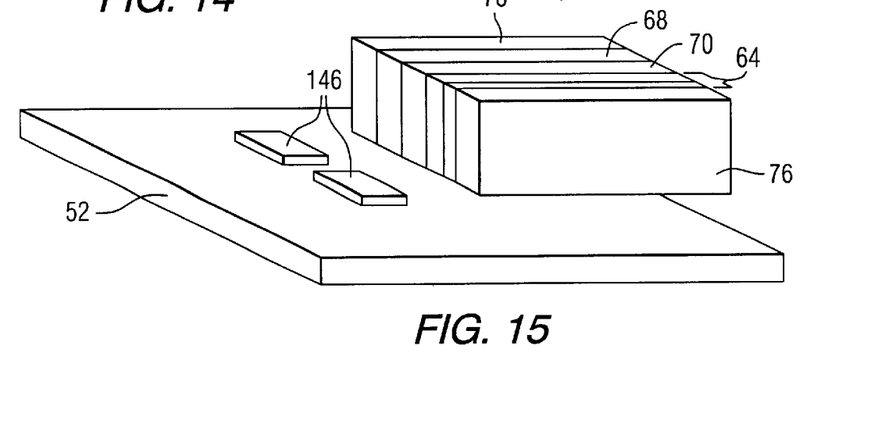
FIG. 15 is a pictorial representation of a portion of a magnetic write head constructed in accordance with another embodiment of the invention.

The CPP spin-transfer writer can be incorporated with a near-field optical antenna for thermally assisted hybrid recording. FIG. 15 is a pictorial representation of a portion of a magnetic write 144 head constructed in accordance with another embodiment of the invention. The write head of this embodiment has a pinned layer 64, non-magnetic layer 70 and free layer 68 similar to that of FIG. 4, but further includes a near-field antenna 146 positioned adjacent to the surface of the magnetic recording medium.

The means for supplying electric current to the write head, not shown in FIGS. 12, 13 and 14, can be similar to that shown in FIG. 4.

Write heads constructed in accordance with the invention include a pillar comprised of alternating layers of magnetic and non-magnetic material, as shown in FIG. 4. The design is structurally very similar to the current-perpendicular-to-the-plane (CPP) giant magnetoresistance (GMR) read heads. A pinned layer has a fixed magnetization that is oriented either toward or away from the media. In the embodiment of FIG. 4, the pinned layer is a synthetic antiferromagnet (SAF), although other hard and/or pinned layer configurations are possible as long as the pinned layer magnetization is fixed. The pinned layer is separated from a soft ferromagnetic free layer by a non-magnetic spacer layer. The non-magnetic spacer must preserve the spin-polarization of the conduction electrons that diffuse between the pinned layer and the free layer. Some possible spacer materials include Cu, Ag or Au. It will simplify the engineering of the device if the thickness and material of the spacer are such that the Ruderman-Kittel-Kasuya-Yosida (RKKY) interlayer coupling energy is negligible. However, this is not a fundamental limitation for actual devices. The quiescent state of the device has the free layer magnetization aligned parallel to the media and orthogonal to the magnetization of the pinned layer. Several options are possible for free layer biasing, including shape anisotropy, field-induced anisotropy, and using magnetostatic fields from permanent magnets. The device operates by rotating the free layer magnetization between parallel and antiparallel configurations with respect to that of the pinned layer through the application of a spin-polarized CPP electron current. The fringe field from the free layer is then used to record bits in the media.

The fundamental physical effect employed in this invention is based on a theoretical prediction that has recently been confirmed experimentally. It is important to emphasize that magnetization rotation is not caused by the magnetic fields generated from the electrical current, as is the case for a conventional writer and as has been observed in CPP GMR sensors with large cross-sectional area. The mechanism used in this invention originates from the transfer of angular momentum from spin-polarized conduction electrons to a ferromagnetic layer and the consequent torque exerted by this "spin-transfer". This spin-transfer torque is a function of both the magnitude and direction of the current and can be expressed as a torque per unit area, $$\vec{\Gamma}_{FL} = \frac{h}{e} Jg(\theta) \vec{m}_{FL} \times (\vec{m}_{FL} \times \vec{m}_{PL}), \tag{1}$$

where h is Plank's constant, e is the electron charge, J is the electrical current density, and $\vec{m}_i = \vec{M}_i / |\vec{M}_i|$ is the unit magnetization vector of either the free layer or pinned layer. The function $g(\theta)$ is dependent upon the spin polarization of the free layer and pinned layer and the relative angle of the free layer and pinned layer magnetizations. For a free layer and pinned layer with equal spin polarization, P, this function has following form:

$$g(\theta) = \left( -4 + \frac{(1+P)^3(3 + \vec{m}_{FL} \cdot \vec{m}_{PL})}{4P^{3/2}} \right). \tag{2}$$

For a fixed pinned layer magnetization, the spin-transfer torque simply adds a unidirectional anisotropy to the free layer, leading to an effective anisotropy field given by:

$$H_{ani} = \frac{h}{e} Jg(\theta) \frac{1}{l_s^{FL} M_{FL}} (\vec{m}_{FL} \times \vec{m}_{PL}), \tag{3}$$

where $l_s^{Fl}$ is the spin diffusion length in the free layer. One caveat, however, is that this concept of an effective anisotropy field cannot be applied to situations with arbitrarily large current densities because spin waves can be excited in the ferromagnetic layer rather than having uniform rotation of the magnetization. This constraint places upper bounds on the practical volume and magnetic moment of the free layer and the maximum allowable current density.

The net result is that the equilibrium magnetization of the free layer will be oriented in a minimum energy configuration determined by all relevant magnetic anisotropies in the system, including that induced by the spin-polarized electrons. More importantly, it is possible to design a device in which there will be directionally dependent current thresholds beyond which the spin-transfer torque will dominate and induce either parallel or antiparallel alignment of the free layer with respect to the pinned layer, as shown schematically in FIGS. 5 and 6. Experiments have demonstrated reversible switching of a small ferromagnetic element between parallel and antiparallel configurations. The critical currents for 180° switching of a thin film free layer with volume $V_{fl}$ and anisotropy $H_K$ in an applied field H can be calculated using Equations 1 and 2 along with the Landau-Lifshitz-Gilbert equation. The result is expressed as $$I_c^\pm = \frac{\alpha e M_{FL} V_{FL}}{hg(\theta)} (H \pm H_K \pm 2\pi M_{FL}), \tag{4}$$

where α is the phenomenological Landau-Lifshitz-Gilbert damping parameter and θ is either 0 or π for parallel (+) or antiparallel (−) alignment, respectively. The predictions from this equation agree rather well with the observed experimental value of ~4 mA for a Co ($B_s$=1.7 T) element 2.5 nm thick, with a 60 nm×130 nm cross-sectional area (volume=19500 $Dm^3$). It has also been quoted that spin-polarized current induced switching has been observed for 2.5 nm thick elements with cross-sectional areas up to 200 nm in diameter (i.e. volume~78000 $nm^3$), which will be assumed to be an upper bound on the volume of the element.

This invention provides a writer in a recording head. Hence, the write field produced by the device is a critical measure of its performance. In addition, the device parameters should be such that spin-transfer can rotate the free layer as described above. As an example, assume some of the recording parameters proposed for a data density of 1 Tbit/$in^2$. The writer width in the cross-track direction is assumed to be 38 nm. In addition, perpendicular recording is assumed in which the media has a soft underlayer below the hard layer that stores the bits. The distance between the head to the soft underlayer is specified as 15 nm. Using published data as a guide and assuming a 5 mA write current, the corresponding, or re-scaled, free layer volume can be estimated to be 14600 $nm^3$ for 2.2 T material.

The field calculations assume a uniformly magnetized free layer, plus use superposition and the method of images.

In addition, it is assumed that soft ferromagnetic material is behind the free layer. The soft ferromagnetic material perfectly screens the magnetic charges at the back of the free layer and provides a return path for the flux flowing to the media. The field component perpendicular to the media is shown in FIGS. 10a, 10b, 10c, 11a, 11b and 11c. One observation from the data in FIGS. 10a, 10b, 10c, 11a, 11b and 11c is that the write field is relatively small in comparison to high anisotropy media that will be necessary for thermal stability. However, the relatively low value of $\mu_0 H_z$ is due to the spacing loss between the free layer and its image in the soft underlayer. This limitation will be common to both the CPP writer and conventional writers unless the spacing can be reduced. Another observation is the large amplitude of the current density. But, while 1 mA produces a large current density (~$10^8$ A/cm$^2$) through the pillar, this current density is roughly the same as that proposed for a CPP read head and has been shown to be sustainable with no detectable annealing or electromigration. Furthermore, the write current necessary to rotate the free layer should be lower for the write heads of this invention since the free layer is oriented 90° with respect to the pinned layer in its quiescent state. Hence, Equation 1 predicts that the torque on the free layer will be larger. Finally, the calculations and the designs can certainly be optimized. This invention presents a fundamentally new concept for the writer in a magnetic recording head.

The structure of FIG. 4 can be modified to improve its write field performance and its current efficiency. For example, soft ferromagnetic material can be used to form a "passive" yoke structure that will help conduct magnetic flux through the free layer and into the soft underlayer, as illustrated in FIG. 13. This type of structure is assumed in the field calculations that are presented in FIGS. 10a, 10b, 10c, 11a, 11b and 11c. This yoke structure can be further modified so that the writer is fully shielded if such modification would improve the field gradient and help localize the write field. In addition, a second pinned layer can be deposited above the free layer with its magnetization oriented such that the torque on the free layer magnetization is doubled, as shown in FIG. 12. This is useful when one wants to reduce the current density in order to stay within the regime of magnetization rotation and not excite spin waves.

The device concept in FIG. 12 can be expanded such that the free layer is broken into two free layers separated by a non-magnetic spacer that depolarizes the electron spins between the two free layers, as shown in FIG. 14. A device with two free layers will potentially have a more stable quiescent state with the two free layers antiparallel to one another and parallel to the air bearing surface. The pinned layer magnetizations are oriented so that the two free layers are parallel and oriented either toward or away from the media when a write current is passed through the device. With this concept the current density can be reduced while still rotating a relatively large volume of magnetic material. FIGS. 11a, 11b and 11c include calculations assuming a two free layer design.

The compact nature of the CPP writer lends itself more favorably to integration with thermally assisted recording. An example of such a geometry for hybrid recording that incorporates a near-field antenna is shown in FIG. 15.

Equations 1 and 2 predict that the writer will be more efficient if ferromagnetic materials with large electron spin-polarization are used. Half-metallic materials exhibit 100% spin-polarization at the Fermi energy and thus represent the ideal pinned layer material. Some examples include $CrO_2$ and Heusler alloys, such as NiMnSb and $Co_2MnGe$.

The write field is maximized by using material for the free layer that has the highest possible moment while still being magnetically soft. It has been demonstrated that $Fe_{65}Co_{35}$ doped with B, Hf, Zr, and other refractory metals can exhibit soft properties while still maintaining a large saturation moment (e.g $B_s$=2.2 T for $(Fe_{65}Co_{35})_{90}B_{10}$ versus the bulk value of 2.45 T).

Good thermal conductors should be used for the electrical leads in order to maximize the thermal conductivity between the head and large thermal reservoirs that are well heat-sunk. Any reduction of the free layer magnetic moment due to heating must be minimized.

From a design standpoint, it is desirable to minimize coupling between the free layer and pinned layer in order to make the free layer switching symmetric with respect to current bias. RKKY coupling can be minimized through choice of material and thickness. Magnetostatic coupling can be minimized by depositing thin films on smooth surfaces with very little roughness.

It is best to minimize the stray field from the pinned layer. An example of a synthetic antiferromagnet (SAF) with thin magnetic layers has been presented to help in this regard. Single hard layers and/or pinned ferromagnetic layers optimally should be thin and have a relatively low moment.

In contrast to a conventional writer, the CPP writer of this invention strips away all parts of the yoke that are superfluous to the write process. All that remains is the pole tip, as illustrated in FIG. 4. The write heads of this invention and the more conventional yoke structure will have the same write field performance for 1 Tbit/in$^2$. They both face fundamental obstacles of head-to-soft underlayer spacing and large anisotropy media. Hence, both approaches will likely have limited write field capability. The invention provides several advantages. The current required to switch the pole tip is relatively small compared to that required of a conventional writer (~1 mA vs. ~10–100 mA). The improvement in efficiency by a factor of 10 to 100 will have many benefits. Among these are reduced power dissipation, relaxed constraints on fast rise time pulse amplitude, and improved switching "strength" when rotating the magnetization of (relatively hard) high-moment materials. As an example, a 5 mV pulse into 50 Ω produces 1 mA of current whereas 5 V into the same impedance is required to produce 100 mA.

In addition, there are at least three advantages with eliminating the yoke and leaving only the pole tip. First, there will be no flux focusing of stray fields, which can be a problem for yoke-type perpendicular write heads. The free layer is not exchange coupled to a large yoke structure (and can even in general be shielded), so the write heads will be much less sensitive to this effect. Second, in a conventional writer, saturation effects away from the pole tip can ultimately reduce the write field. However, this is inconsequential for the present invention since the yoke is eliminated. Third, the invention will avoid complications of stray field from the coil coupling through the flux return pole. Thus, the return flux will be set only by the flux from the free layer. This will benefit media stability as the limits of thermal stability are approached.

The invention is much more closely aligned with the processing technology of the read head, implying greater commonality and allowing easier integration of the reader and writer into a recording head. It is conceivable to deposit the writer and reader thin film multilayers on the same plane (with some sort of masking scheme if the design requires different layering, materials, etc . . . ). Then, both the writer and reader can be lithographically defined at the same process step. This would produce a very accurate and precise separation between the reader and writer from head-to-head, which is advantageous for the servo positioning of the head.

Write heads of this invention are much more compact than a yoke structure. Therefore, they are more easily integrated with the optical components of a thermally assisted recording system, which can help reduce the media coercivity during the write process.

This invention provides a fundamentally different writer technology that uses the torque induced from a CPP spin-polarized electron current to rotate the writer magnetization. This effect has largely been pitched towards magnetic random access memory (MRAM) applications. However, this invention applies that physical effect to the writer in a hard disk drive. The miniaturization of the writer required to record at an areal density of 1 Tbit/in$^2$ means the CPP spin-transfer writer is entering into the realm of practicality. The physical dimensions of the active ferromagnetic layer in the write heads will be comparable to the pole tip of a conventional writer. But, the CPP spin-transfer writer will require much less current to switch the "pole tip" magnetization and it will be significantly more compact.

The write heads described above can be used to write information bits onto a magnetic recording medium in accordance with the method of this invention including the steps of: providing a write head including a first layer of magnetic material having a fixed magnetization aligned in a first direction, a second layer of magnetic material having a changeable magnetization aligned in a quiescent state in a second direction orthogonal to the first direction, a non-magnetic layer positioned between the first layer of magnetic material and the second layer of magnetic material, positioning the write head adjacent to a magnetic storage media such that the second layer of magnetic material lies in a plane perpendicular to a surface of the magnetic storage media, and passing an electric current through the write head, thereby changing the direction of magnetization of the second layer of magnetic material and producing fringing magnetic flux for recording information bits in the magnetic storage media.

This invention is particularly applicable for use in perpendicular recording wherein the magnetic storage media includes a disk having a top layer of hard magnetic material, and a bottom layer of soft magnetic material adjacent to the top layer of hard magnetic material.

More generally, the method of recording information in a magnetic recording medium of this invention comprises the steps of positioning a layer of magnetic material in a plane perpendicular to a surface of the magnetic storage medium, and changing the magnetization of the layer of magnetic material through spin transfer to produce fringing magnetic flux for recording information bits in the magnetic storage media.

The present invention uses a fundamentally different physical mechanism to switch the writer magnetization. This new writer technology promises to be more efficient, compact, and practical as recording densities approach 1 Tbit/in$^2$. The write heads of this invention rely on the purely microscopic quantum-mechanical phenomenon of exchange coupling between the spins of moving and bound electrons in a ferromagnet.

While the present invention has been described in terms of what are at present believed to be its preferred embodiments, it will be apparent to those skilled in the art that various modifications can be made to the disclosed embodiments without departing from the scope of the invention as set forth in the following claims.

What is claimed is:

1. A write head comprising:

a first layer of magnetic material having a fixed magnetization aligned in a first direction;

a second layer of magnetic material having a changeable magnetization aligned in a quiescent state in a second direction orthogonal to the first direction;

a first non-magnetic layer positioned between the first layer of magnetic material and the second layer of magnetic material;

means for connection to a current supply for passing an electric current through the first layer of magnetic material, the first non-magnetic layer, and the second layer of magnetic material for switching the changeable magnetization of the second layer of magnetic material; and means for positioning a first edge of the second layer of magnetic material adjacent to a magnetic recording medium, whereby the magnetization of the second layer of magnetic material affects magnetization of the magnetic recording medium.

2. A write head according to claim 1, further comprising:

means for biasing the direction of magnetization of the first layer of magnetic material.

3. A write head according to claim 1, wherein the means for connection to a current supply comprises:

a first conductor electrically connected to the first layer of magnetic material; and a second conductor electrically connected to the second layer of magnetic material.

4. A write head according to claim 1, further comprising:

a ferromagnetic yoke for conducting magnetic flux passing through the second layer of magnetic material and through the magnetic recording medium.

5. A write head according to claim 1, further comprising:

a third layer of magnetic material having a fixed magnetization aligned parallel to the first direction; and a second non-magnetic layer positioned between the third layer of magnetic material and the second layer of magnetic material.

6. A write head according to claim 5, wherein the means for connection to a current supply comprises:

a first conductor electrically connected to the first layer of magnetic material; and a second conductor electrically connected to the third layer of magnetic material.

7. A write head according to claim 1, further comprising:

a third layer of magnetic material having a fixed magnetization aligned parallel to the first direction;

a fourth layer of magnetic material having a changeable magnetization aligned in a quiescent state in a second direction orthogonal to the first direction;

a second non-magnetic layer positioned between the third layer of magnetic material and the fourth layer of magnetic material; and a third non-magnetic layer positioned between the fourth layer of magnetic material and the second layer of magnetic material.

8. A write head according to claim 7, wherein the means for connection to a current supply comprises:

a first conductor electrically connected to the first layer of magnetic material; and a second conductor electrically connected to the third layer of magnetic material.

9. A write head according to claim 1, further comprising:

a near field antenna positioned adjacent to the magnetic recording medium.

10. A write head comprising:

a first layer of magnetic material having a fixed magnetization aligned in a first direction;

a second layer of magnetic material having a changeable magnetization aligned in a quiescent state in a second direction orthogonal to the first direction;

a first non-magnetic layer positioned between the first layer of magnetic material and the second layer of magnetic material;

a first conductor electrically connected to the first layer of magnetic material;

a second conductor electrically connected to the second layer of magnetic material;

wherein an electric current passing through the first layer of magnetic material, the first non-magnetic layer, and the second layer of magnetic material switches the changeable magnetization of the second layer of magnetic material; and wherein the magnetization of the second layer of magnetic material affects magnetization of an adjacent magnetic recording medium.

11. A write head according to claim 10, further comprising:
a permanent magnet for biasing the direction of magnetization of the first layer of magnetic material.

12. A write head according to claim 10, further comprising:
an antiferromagnet for biasing the direction of magnetization of the first layer of magnetic material.

13. A write head according to claim 10, further comprising:
a ferromagnetic yoke for conducting magnetic flux passing through the second layer of magnetic material and through the magnetic recording medium.

14. A write head according to claim 10, further comprising:
a near field antenna positioned adjacent to the magnetic recording medium.

15. A write head comprising:
a first layer of magnetic material having a fixed magnetization aligned in a first direction;

a second layer of magnetic material having a changeable magnetization aligned in a quiescent state in a second direction orthogonal to the first direction;

a first non-magnetic layer positioned between the first layer of magnetic material and the second layer of magnetic material;

a third layer of magnetic material having a fixed magnetization aligned parallel to the first direction;

a second non-magnetic layer positioned between the third layer of magnetic material and the second layer of magnetic material;

a first conductor electrically connected to the first layer of magnetic material;

a second conductor electrically connected to the third layer of magnetic material;

wherein an electric current passing through the first layer of magnetic material, the first non-magnetic layer, and the second layer of magnetic material switches the changeable magnetization of the second layer of magnetic material; and wherein the magnetization of the second layer of magnetic material affects magnetization of an adjacent magnetic recording medium.

16. A write head according to claim 15, further comprising:
a permanent magnet for biasing the direction of magnetization of the first layer of magnetic material.

17. A write head according to claim 15, further comprising:
an antiferromagnet for biasing the direction of magnetization of the first layer of magnetic material.

18. A write head according to claim 15, further comprising:
a ferromagnetic yoke for conducting magnetic flux passing through the second layer of magnetic material and through the magnetic recording medium.

19. A write head according to claim 15, further comprising:
a near field antenna positioned adjacent to the magnetic recording medium.

20. A write head comprising:
a first layer of magnetic material having a fixed magnetization aligned in a first direction;

a second layer of magnetic material having a changeable magnetization aligned in a quiescent state in a second direction orthogonal to the first direction;

a first non-magnetic layer positioned between the first layer of magnetic material and the second layer of magnetic material;

a third layer of magnetic material having a fixed magnetization aligned parallel to the first direction;

a fourth layer of magnetic material having a changeable magnetization aligned in a quiescent state in a second direction orthogonal to the first direction;

a second non-magnetic layer positioned between the third layer of magnetic material and the fourth layer of magnetic material; and a third non-magnetic layer positioned between the fourth layer of magnetic material and the second layer of magnetic material;

a first conductor electrically connected to the first layer of magnetic material;

a second conductor electrically connected to the third layer of magnetic material;

wherein an electric current passing through the first layer of magnetic material, the first non-magnetic layer, and the second layer of magnetic material switches the changeable magnetization of the second layer of magnetic material; and wherein the magnetization of the second layer of magnetic material affects magnetization of an adjacent magnetic recording medium.

21. A write head according to claim 20, further comprising:
a permanent magnet for biasing the direction of magnetization of the first layer of magnetic material.

22. A write head according to claim 20, further comprising:
an antiferromagnet for biasing the direction of magnetization of the first layer of magnetic material.

23. A write head according to claim 20, further comprising:
a ferromagnetic yoke for conducting magnetic flux passing through the second layer material and through the magnetic recording medium.

24. A write head according to claim 20, further comprising:
a near field antenna positioned adjacent to the magnetic recording medium.

* * * * *

UNITED STATES PATENT AND TRADEMARK OFFICE
CERTIFICATE OF CORRECTION

PATENT NO.         : 6,809,900 B2
APPLICATION NO. : 09/943329
DATED                 : October 26, 2004
INVENTOR(S)       : Mark William Covington It is certified that error appears in the above-identified patent and that said Letters Patent is hereby corrected as shown below:

Column 1, Line 55
"mn." should read --nm.--

Column 5 Line 54
"$I_c^-<I_c^-$" should read --$I_c^-<I_c^+$--

Column 6, Line 25
Add a comma after "$I_q$"

Column 6, Line 29
"$I_c^-$" should read --$I_c^+$--

Column 7, Line 21 (Table)
"$W_{fl}$" should read --$w_{fl}$-- (lower case)

Column 10, Line 42
"θ" should read --0--

Column 10, Line 47
"$Dm^3$" should read --$nm^3$--

Signed and Sealed this

Twenty-seventh Day of February, 2007

JON W. DUDAS
*Director of the United States Patent and Trademark Office*